United States Patent
Kramer et al.

(10) Patent No.: US 12,370,833 B2
(45) Date of Patent: Jul. 29, 2025

(54) RUBBERIZED STRENGTH MEMBER FOR ELASTOMERIC PRODUCTS, IN PARTICULAR VEHICLE TYRES, WHEREIN THE STRENGTH MEMBER HAS AT LEAST ONE FIRST YARN, METHOD FOR PRODUCING THE RUBBERIZED STRENGTH MEMBER, AND VEHICLE TYRE HAVING AT LEAST ONE RUBBERIZED STRENGTH MEMBER

(71) Applicant: Continental Reifen Deutschland GmbH, Hannover (DE)

(72) Inventors: Thomas Kramer, Herford (DE); Nermeen Nabih, Hannover (DE); Wolfgang Reese, Peine (DE); Michael Schunack, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 18/254,566

(22) PCT Filed: Oct. 25, 2021

(86) PCT No.: PCT/EP2021/079488
§ 371 (c)(1),
(2) Date: May 25, 2023

(87) PCT Pub. No.: WO2022/111927
PCT Pub. Date: Jun. 2, 2022

(65) Prior Publication Data
US 2024/0001714 A1    Jan. 4, 2024

(30) Foreign Application Priority Data
Nov. 25, 2020   (EP) .................................... 20209683

(51) Int. Cl.
*B60C 9/00*   (2006.01)
*B60C 15/00*  (2006.01)
(Continued)

(52) U.S. Cl.
CPC ........ *B60C 9/0042* (2013.01); *B60C 15/0009* (2013.01); *D01D 5/084* (2013.01);
(Continued)

(58) Field of Classification Search
CPC ..................... B60C 9/0042; B60C 2009/0466; D02G 3/48; D02G 3/02; D02G 3/28;
(Continued)

(56) References Cited

U.S. PATENT DOCUMENTS 4,195,052 A    3/1980   Davis et al.

FOREIGN PATENT DOCUMENTS

| CN | 102277646 A | 12/2011 |
| CN | 108084424 A | 5/2018 |

(Continued)

OTHER PUBLICATIONS

Huang, English Machine Translation of CN 108084424, 2018 (Year: 2018).*

(Continued)

*Primary Examiner* — Camie S Thompson
(74) *Attorney, Agent, or Firm* — Richard A. Wolf; Gregory Adams

(57) ABSTRACT

The invention relates to a rubberized strength member for elastomeric products, especially vehicle tires, wherein the strength member includes at least one first yarn, to a process for producing the rubberized strength member and to a motor vehicle tire including at least one rubberized strength member.

(Continued)

According to the invention, the first yarn is a yarn of HMLS-PET comprising recycled PET.

18 Claims, 1 Drawing Sheet

(51) Int. Cl.
*D01D 5/084* (2006.01)
*D01D 5/088* (2006.01)
*D01F 6/62* (2006.01)
*D02G 3/02* (2006.01)
*D02G 3/28* (2006.01)
*D02G 3/48* (2006.01)

(52) U.S. Cl.
CPC ............... *D01D 5/088* (2013.01); *D01F 6/62* (2013.01); *D02G 3/02* (2013.01); *D02G 3/28* (2013.01); *D02G 3/48* (2013.01); *D10B 2331/04* (2013.01); *D10B 2401/04* (2013.01); *D10B 2505/022* (2013.01)

(58) Field of Classification Search
CPC .......... D01D 5/084; D01D 5/088; D01F 1/10; D01F 6/62; D01F 6/92; D01G 11/00; D10B 2331/04; D10B 2401/04; D10B 2505/022
See application file for complete search history.

(56) References Cited

FOREIGN PATENT DOCUMENTS

| | | |
|---|---|---|
| DE | 102010017107 A1 | 12/2011 |
| DE | 102014211362 A1 | 12/2015 |
| EP | 2708380 A1 | 3/2014 |
| JP | 2003119268 A | 4/2003 |
| JP | 2004100087 A | 4/2004 |
| JP | 2012041463 A | 3/2012 |
| JP | 2014504338 A | 2/2014 |
| KR | 20010011919 A | 2/2001 |
| KR | 20120069339 A | 6/2012 |
| KR | 20170002992 A | 1/2017 |
| KR | 20170002992 U | 8/2017 |
| WO | 2014001039 A1 | 1/2014 |
| WO | 2019015792 A1 | 1/2019 |
| WO | 2022049171 A1 | 3/2022 |

OTHER PUBLICATIONS

International search report dated Feb. 2, 2022 of International application PCT/EP/2021/079488 claiming priority to this application.
European Examination Report dated Mar. 24, 2024 for the priority European Patent Application No. 20 209 683.0 and machine translation of same.
Notice of Reasons for Refusal drafted Jul. 1, 2024 for the counterpart Japanese Patent Application No. 2023-526103 and machine translation of same.
Examination Report dated Jul. 31, 2024 for the counterpart European Patent Application No. 21 799 027.4 and machine translation of same.
Preliminary Office Action published Jul. 30, 2024 for the counterpart Brazilian Patent Application No. BR112023007908.0. and machine translation of same.
Notice of Reasons for Refusal mailed on Dec. 4, 2024 for the counterpart Japanese Patent Application No. 2023-526103 and machine translation of same.
CN Office Action dated Mar. 31, 2025 of counterpart Chinese Patent Application No. 202180079339.3.
BR Office Action published Jan. 28, 2025 of counterpart Brazilian Patent Application No. BR112023007908-0.
KR Office Action dated May 7, 2025 of counterpart Korean Application No. 10-2023-7014309.

* cited by examiner

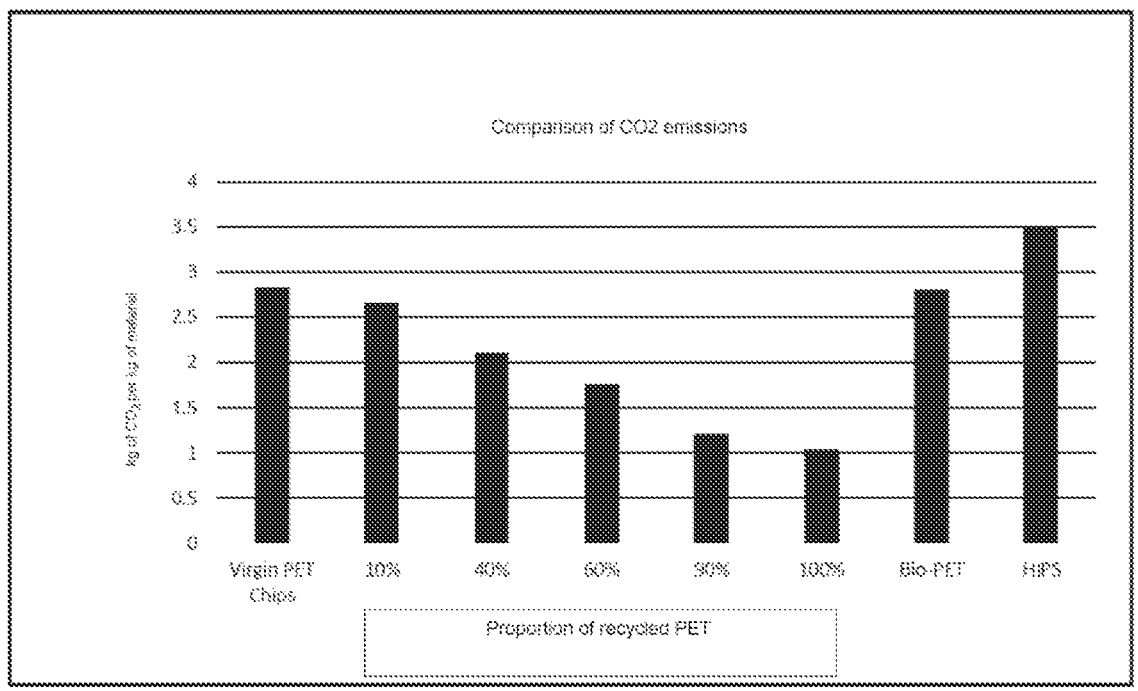

RUBBERIZED STRENGTH MEMBER FOR ELASTOMERIC PRODUCTS, IN PARTICULAR VEHICLE TYRES, WHEREIN THE STRENGTH MEMBER HAS AT LEAST ONE FIRST YARN, METHOD FOR PRODUCING THE RUBBERIZED STRENGTH MEMBER, AND VEHICLE TYRE HAVING AT LEAST ONE RUBBERIZED STRENGTH MEMBER

The invention relates to a rubberized strength member for elastomeric products, especially vehicle tires, wherein the strength member includes at least one first yarn, to a process for producing the rubberized strength member and to a motor vehicle tire including at least one rubberized strength member.

Strength members for reinforcing various elastomeric products are well known. It is known in respect of vehicle tires that they usually have various strength members in various components, each of which is surrounded by a rubber mixture, also called rubberization mixture. The strength members are thus present as rubberized strength members in the vehicle tire.

In those components in which textile strength members are used, the material used for the (textile) strength member is often polyethylene terephthalate (PET).

It is likewise known that it is possible to use PET with specific properties, for example what is called HMLS-PET. HMLS-PET is a High Modulus Low Shrinkage polyethylene terephthalate (HMLS-PET).

HMLS-PET is used especially in the carcass ply of vehicle tires in order to optimize flatspot characteristics (=reversible plastic flattening in the ground contact area when parked) and to avoid extensive sidewall constriction.

A further aim is to resolve, or at least achieve an improvement in, trade-offs between sustainability and performance demands that exist in the selection of the materials for elastomeric products, such as vehicle tires.

DE 102010017107 A1 discloses a reinforcement cord including at least one yarn of recycled PET. The recycled PET may especially come from PET drinks bottles.

However, there are limits to the use of recycled PET on account of its properties. For instance, recycled PET from bottles contains additions that impair crystallization during the processing operation, such as, in particular, during the spinning process to give an industrial yarn. This worsens physical properties compared to traditional PET, i.e. PET that is not recycled PET but is from virgin production. This is manifested especially in the case of PET on which high demands are made with regard to shrinkage, deformability and stretch, and also strength.

It is therefore an object of the present invention to provide a rubberized strength member for elastomeric products, especially vehicle tires, wherein the strength member includes at least one first yarn which has high strength and high extensibility and which is simultaneously produced with maximum conservation of resources, maximum sustainability and minimum impact on the environment.

This object is achieved in that the first yarn is a yarn of HMLS-PET comprising recycled PET.

The first yarn preferably comprises 10% to 100% by weight of recycled PET.

The first yarn of HMLS-PET comprising recycled PET, preferably 10% to 100% by weight of recycled PET, is also referred to in the context of the present invention as "the first yarn".

It was surprisingly possible to provide a rubberized strength member including at least one yarn of PET, wherein the yarn comprises recycled PET, preferably 10% to 100% by weight, and simultaneously has a high modulus and hence high strength coupled with low shrinkage and hence can be classified as an HMLS-PET yarn.

The strength member of the invention has the advantages that it can be produced in a more resource-conserving and environmentally benign manner than virgin PET and nevertheless meets the high demands on properties, especially for use in elastomeric products, as in the carcass ply of vehicle tires.

The weight figures in percent (% by weight) are based on the unrubberized and unpretreated, i.e. especially undipped, yarn.

"Recycled PET" in the context of the present invention is understood to mean PET that has been obtained from used PET products such as PET bottles or other PET articles such as clothing, for example.

The direct starting material for recycled PET is not mineral oil but bottles or other articles of PET.

The preferred process for obtaining recycled PET having HMLS properties is set out in detail below.

Further advantages and features of the strength member of the invention are apparent from the dependent claims that relate to advantageous configurations of the present invention and as such should not be interpreted in a limiting manner. The invention also encompasses combinations of the features of different dependent claims where technically possible, even if the dependent claims do not relate to one another or if they belong to different claim categories. This is also true of the individual features of the working examples discussed hereinafter to the extent that the person skilled in the art is unable to recognize these as necessarily belonging together. The invention likewise encompasses combinations of features that are identified as preferred, particularly preferred etc., it being possible to combine a first feature identified as "preferred" with a further, second feature identified as "particularly preferred", for example, unless the opposite is explicitly apparent from the content or for technical reasons.

If the strength member comprises less than 100% by weight of recycled PET, i.e., for example and in particular, 10% to <100% by weight of recycled PET, the residual component is virgin PET that has not undergone any recycling process and originates from mineral oil-based (petrochemical) or renewable raw materials.

With a content of 10% to 100% by weight of recycled PET in the first yarn, the cost and $CO_2$ burden in the production of the rubberized strength members and motor vehicle tires of the invention are individually adjustable.

The object underlying the invention is achieved particularly efficiently with a higher proportion of recycled PET, but even a proportion of recycled PET of 10% by weight, for example, makes a contribution to conservation of resources and a lower $CO_2$ burden.

In advantageous embodiments, the first yarn of HMLS-PET comprises 20% to 100% by weight of recycled PET.

In advantageous embodiments, the first yarn of HMLS-PET comprises 30% to 100% by weight of recycled PET.

In advantageous embodiments, the first yarn of HMLS-PET comprises 40% to 100% by weight of recycled PET.

In advantageous embodiments, the first yarn of HMLS-PET comprises 50% to 100% by weight of recycled PET.

In advantageous embodiments, the first yarn of HMLS-PET comprises 60% to 100% by weight of recycled PET.

In advantageous embodiments, the first yarn of HMLS-PET comprises 70% to 100% by weight of recycled PET.

In advantageous embodiments, the first yarn of HMLS-PET comprises 80% to 100% by weight of recycled PET.

In advantageous embodiments, the first yarn of HMLS-PET comprises 90% to 100% by weight of recycled PET.

In advantageous embodiments, the first yarn of HMLS-PET comprises 100% by weight of recycled PET.

Especially preferably, the yarn of HMLS-PET comprises 30% to 100% by weight, more preferably 50% to 100% by weight, of recycled PET.

Recycled PET differs from virgin PET by additions, such as by the isophthalic acid (IPA) content in particular. These additions, especially by IPA, are present, for example and in particular, in PET bottles.

While virgin PET has an isophthalic acid content of 0% by weight, the IPA content in recycled PET may be up to 5% by weight.

More particularly, in the recycled PET used in the context of the present invention, it is, for example and in particular, 1.2% to 2.2% by weight.

The weight figures in percent (% by weight) are based here on the PET and hence, in the strength member of the invention, on the unrubberized and unpretreated, i.e. especially undipped, yarn.

In the case of a proportion of 10% by weight of recycled PET and 90% by weight of virgin, mineral oil-based PET, isophthalic acid content is thus 0.12% to by weight, preferably 0.12% to 0.22% by weight.

Thus, the first yarn of HMLS-PET preferably has an isophthalic acid (IPA) content of 0.12% to 5% by weight, for example and with preference 0.12% to 2.2% by weight.

An "HMLS yarn" is understood here to mean a high-modulus low-shrinkage yarn.

The first yarn of HMLS-PET here, in particular and with preference, has a hot shrinkage of less than 8%, more preferably 4% to 8%, and an elongation at 45 N of less than 0.0056%/den (percent per denier), more preferably 0.002 to 0.0056%/den, with filament finenesses of less than 5 den, more preferably 3 to 5 den.

These figures are particularly suitable for characterization of the first yarn of HMLS-PET as HMLS yarn.

The first yarn of the strength member of the invention preferably has a breaking strength of 7.0 to 9.0 g/den (grams per denier).

The first yarn of the strength member of the invention preferably has an elongation at break of 10.2% to 15.5%.

The first yarn is especially and preferably a continuous multifilament yarn and hence preferably not a monofilament yarn and preferably not a staple fiber yarn.

The first yarn of the strength member of the invention preferably comprises filaments having filament finenesses of less than 5 den, meaning that each filament of the yarn is preferably finer than 5 den. More preferably, the first yarn has filament finenesses of 3 to 5 den.

Preferably, the first yarn has an elongation at a force of 45 N of less than 0.0056%/den.

Tensile strength, elongation at 45 N and elongation at break are determined in the context of the present invention by means of an Instron tensile tester to ASTM D885: Instron 5564 instrument, clamp: C-clamp, 2714-004 with pneumatic activation, load capacity 1 kN (1 kilonewton), test conditions: gauge length 250 mm, cross-head speed 300 mm/minute, pre-tension 0.05 gf/den (gram force per denier), air pressure 0.4 to 0.6 MPa, conditioning of the samples before the test: 24 hours at 24±(plus/minus) 2° C., 55±5% air humidity.

The first yarn of the strength member of the invention preferably has a hot shrinkage of 3.2% to 5.2% at 177° C.

The hot shrinkage of yarns in the context of the present invention is determined by means of the hot shrinkage method to ASTM D885. The test conditions are: temperature 177° C., load 0.05 g/den, duration 10 min.

The first yarn of HMLS-PET preferably has a crystallization level of 45% to 53.5%.

The crystallization level is determined to ASTM D1505 as follows: A density gradient column is first used to ascertain the yarn density. Subsequently, the crystallization level is calculated by interpolation using the literature values for the density of 100% amorphous and 100% crystalline PET specified hereinafter. The density of 100% amorphous PET is 1.333 g/cm$^3$, while that of 100% crystalline PET is 1.455 g/cm$^3$.

With such a crystallization level, the yarn and hence the strength member of the invention is producible and simultaneously has the properties necessary in terms of elongation and shrinkage characteristics for the high demands, especially in the case of use in the carcass ply of vehicle tires.

Preferably, the first yarn of HMLS-PET has a fineness of 300 to 4000 denier (den), preferably 300 to 3100 den, more preferably 300 to 2000 den, most preferably 900 to 2000 den.

In a first embodiment, the first yarn is twisted and processed further as described below. In this embodiment, the strength member of the invention comprises a twisted rubberized yarn.

In a further advantageous embodiment, it is also possible for one or more yarns to be twisted to form a cord. In each case, a first yarn, as described in accordance with the invention, is an HMLS-PET yarn comprising preferably 10% to 100% by weight of recycled PET.

The at least one further (second) yarn, in a particularly preferred embodiment, is likewise an HMLS-PET yarn comprising preferably 10% to 100% by weight of recycled PET, such that, in this embodiment, at least two of the HMLS-PET yarns described are twisted together to form a cord.

In an advantageous embodiment of the invention, the first yarn is twisted in the form of an x2 cord, where the cord has a twist factor of 150 to 250, preferably 170 to 230, and a breaking force of at least 6.3 g/den, preferably 6.3 to 10 g/den, and has an elongation at 45 N of less than 0.0056%/den, preferably 0.0005% to and hot shrinkage of less than 3%, preferably 1% to 3%, more preferably 1.5% to 2.5%.

The expression "x2 cord" means that two yarns have been twisted together. In the embodiment described, a first yarn—as described in accordance with the invention an HMLS-PET yarn comprising recycled PET—is twisted with preferably a second, further HM LS-PET yarn comprising recycled PET to give a cord.

The hot shrinkage of cords in the context of the present invention is determined by means of the hot shrinkage method to ASTM D885 at 180° C. The test conditions are: temperature 180° C., load 0.05 g/den, duration 10 min.

In further preferred embodiments, it is alternatively conceivable that the at least one further yarn is a different yarn and hence the strength member of the invention is a hybrid cord comprising an HMLS-PET yarn comprising preferably 10% to 100% by weight of recycled PET and at least one further yarn. The at least one further yarn here is (consists) preferably of a nonmetallic material. The nonmetallic material is preferably selected from the group comprising polyamide (PA) and/or aramid and/or polyetherketone (PEK)

and/or polyketone (POK) and/or polyethylene naphthalate (PEN) and/or rayon and/or viscose and/or natural fibers and/or glass fibers.

The yarns described and/or the cords described, in preferred embodiments, have been woven to form a textile ply before the latter is processed further by activation of adhesion and rubberization with a rubberization mixture.

The present invention further provides a strength member ply composed of a multitude of rubberized strength members of the invention.

The present invention further provides a vehicle tire including at least one rubberized strength member of the invention.

In advantageous embodiments of the invention, the vehicle tire includes a multitude of rubberized strength members of the invention in a strength member ply.

The strength member ply is preferably the carcass ply and/or a belt ply and/or a bandage ply and/or a bead reinforcement, more preferably at least the carcass ply.

The vehicle tire of the invention may thus also include the strength member of the invention in one or more components, preferably at least in the carcass ply.

In an advantageous embodiment of the invention, the strength member ply is at least the carcass ply, where the carcass ply is run around the bead once (one-ply construction) or twice (two-ply construction) in a turnup, wherein the end of the ply/plies lies between the core and the edge of the belt.

In this way, the vehicle tire can fulfill its required load-bearing capacity (taking account of the respective load index).

In an advantageous development of this embodiment, in addition to the one or two carcass plies that are run around the bead, a further strength member ply comprising strength members of the invention is disposed in the sidewall up to or beneath the bead.

This improves the vehicle tire further in terms of its load-bearing capacity.

There follows a description of a particularly preferred process by which the first yarn of the rubberized strength member can be obtained. The yarn is produced as described as a continuous multifilament yarn. The process steps described in detail are implemented using apparatuses known to the person skilled in the art, unless stated otherwise.
  a) provision of PET chips comprising 100% by weight of recycled PET from PET bottles or other PET products and optionally provision of chips of virgin PET;
  b) pre-crystallization, crystallization and solid-state polymerization (SSP) of the PET chips from step a) to give high-viscosity PET chips having an intrinsic viscosity of 0.85 to 1.15 dl/g (deciliters per gram);
  c) drying, optionally mixing the chips of recycled PET with chips of virgin PET to obtain PET chips comprising up to 10% to 100% by weight of chips from recycled PET,
    melting and extruding of the PET chips for the yarn spinning, subsequent yarn spinning by means of a spinneret comprising a reheater having a buffer zone, and stepwise cooling of the unstretched yarn, wherein the water content of the chips after drying is less than 30 ppm, the temperature of the reheater beneath the spinneret is 280 to 350° C. and the length of the buffer zone beneath the reheater during the stepwise cooling is 20 to 100 mm;
  d) oiling, drawing, heat-setting and winding after the stepwise cooling in step c) to obtain an HMLS-PET yarn.

The fact that recycled PET can be provided in the form of chips is known to the person skilled in the art. The chips may also be referred to as "granules".

"PET chips comprising 100% by weight of recycled PET from PET bottles or other PET products" is also referred to here as "chips of recycled PET".

Intrinsic viscosity is determined in the context of the present invention by means of an Ubbelohde capillary viscometer to ASTM D4603.

If the yarn comprises less than 100% by weight of recycled PET, i.e. especially 10% to <100% by weight of recycled PET, the residual component is virgin PET that has not undergone any recycling process and originates from mineral oil-based (petrochemical) or renewable raw materials.

In this case, in an additional process step—referred to above as "optionally mixing", chips of recycled PET and chips of virgin PET are mixed with one another before the spinning process. This mixing is preferably effected in a single-screw conveying system after the drying step.

If 100% by weight of recycled PET is used, the additional mixing step is unnecessary and the chips are dried and extruded directly.

Additions present in recycled PET, for example of alternative monomers to p-terephthalic acid, for example IPA, weaken the ability of the PET to crystallize during the spinning process. This complicates spinning and drawing to form a yarn, and the properties thereof are worsened compared to a yarn of virgin PET.

The pre-crystallization, crystallization and solid-state polymerization (SSP) in step b) achieve further polymerization and hence a reduction in the proportion of shorter polymer molecules, which achieves molecular chain growth. This results in elevated intrinsic viscosity. This improves the drawability of the material, with an improvement in the tensile stiffness and modulus (stiffness) of the yarn as well.

By combining the pre-crystallization and crystallization with the temperature of the reheater beneath the spinneret of 280 to 350° C. and the length of the buffer zone under the reheater during the stepwise cooling of 20 to 100 mm in step c), it is possible to adjust the crystallization rate in such a way as to choose a high spinning speed and a high tension rate in the spinning process.

Moreover, the frequency of filament and yarn breakage is reduced, which results in a yarn having high tensile stiffness and high modulus.

Solid-state polymerization (SSP) is a process in which the crude PET chips are placed in a reactor and heated in order to polymerize. This increases molecular chain length and intrinsic viscosity. The intrinsic viscosity of recycled PET chips is to 0.75 dl/g.

Solid-state polymerization is also referred to as solid-phase condensation, since the withdrawal of water results in condensation.

More preferably, these raw chips that are still of relatively low viscosity are treated as follows:

The raw PET chips are preferably pre-crystallized at a temperature of 150 to 180° C. for 0.5 to 1.5 hours and then crystallized at a temperature of 200 to 230° C. for 4 to 6 hours and finally left to react in an SSP reactor at a wall temperature of 200 to 220° C. for 30 to 35 hours.

The entire system of apparatuses is operated in a nitrogen atmosphere, where the oxygen content of the nitrogen is kept at 30 to 70 ppm and the dew point is preferably lower than −70° C. (lower than minus 70° C.).

The intrinsic viscosity of the raw PET chips is increased here to 0.85 to 1.15 dl/g, giving high-viscosity chips.

Preference is given to drying under nitrogen in step c), where the drying temperature is preferably 120 to 160° C. and the drying time is preferably more than 8 hours. This reduces the water content of the high-viscosity chips to less than ppm.

Preference is given to effecting the melting and extruding of the high-viscosity PET chips in step c) in the form of a melt extrusion in a screw extruder, wherein the temperature in the feed zone of the screw extruder is 300 to 330° C., the temperature in the compression zone is 290 to 320° C. and the temperature in the metering zone (discharge zone) is 280 to 310° C., and the pressure at the extruder head is 14 to 18 MPa (megapascal). This affords a melt.

The melt extrusion can also improve the melt viscosity and fluidity of the high-viscosity chips, and further reduce the adverse effects resulting from the IPA content and hence further improve drawability.

If high-viscosity chips of recycled PET have been mixed beforehand with chips of virgin PET, the extrusion step further improves the homogeneity of the mixture of recycled and virgin PET.

The spinning (in step c) is preferably effected by means of a spinning jet, wherein the length-diameter ratio (L/D) of the spinneret hole in advantageous embodiments is 1.2 to 3.0.

The spinneret, in advantageous embodiments, comprises 180 to 480 holes, and a yarn of 1000 to 1500 denier is obtained.

In further advantageous embodiments, it is possible to obtain a yarn of 300 to 4000 denier (den), preferably 300 to 3100 den, more preferably 300 to 2000 den, even more preferably 900 to 2000 den, for example and especially 500 denier, 2000 denier or 4000 denier. If a fineness of more than 1500 denier is chosen, the number of spinneret holes may be more than 480.

Preferably, a yarn having filaments having filament finenesses of less than 5 denier (den) is obtained. More preferably, a yarn having filaments having filament finenesses of 3 to 5 den is obtained.

The stepwise cooling in step c) has the purpose of consolidating the melt of the undrawn yarn.

Preferably, the stepwise cooling in step c) comprises a circular quench system downstream of the buffer zone, wherein cooling air is blown from the outside into the inner ring, the blowing pressure here is 15 to 50 Pa and the blowing temperature is 22 to 65° C.

This prevents adhesion of the undrawn yarn, which simplifies, or does not complicate, the downstream drawing process in step d). The preferred parameters of blowing pressure and temperature of the air blown in prevent excessively rapid and excessively slow cooling, which in turn prevents adhesion of the undrawn yarn and deterioration of the physical properties.

If the undrawn yarn is cooled down too quickly, drawing in particular in the spinning operation is made more difficult.

If the undrawn yarn is cooled down too slowly, there is a particular risk of elevated adhesion and of deterioration in the physical properties.

For the reasons mentioned, it is particularly advantageous when the undrawn yarn is reheated, cooled down stepwise by means of a circular quench system downstream of the buffer zone and cooled with cooling air after the melt spinning.

The oiling in step d) has the advantage that the cohesion of the undrawn yarn is increased, and friction forces and static electrical charges are reduced. This likewise facilitates the downstream drawing process and reduces the frequency of filament and yarn breaks. Moreover, this is also advantageous for the downstream processing steps to give the rubberized strength member or to give the woven ply, namely for the twisting and weaving in particular, since the yarn glides better as a result of oiling.

Preferably, the oil is used in an emulsion and the oil uptake rate is preferably to 0.9% by weight, based on the yarn.

The drawing in step d) is preferably effected by means of a godet roll construction, wherein a first godet roll pair (GR1) is operated at a speed of 2700 to 3200 m/min at a temperature of 60 to 80° C., a second godet roll pair (GR2) at a speed of 3800 to 5000 m/min at a temperature of 70 to 90° C. and a third godet roll pair (GR3) at a speed of 5800 to 6200 m/min at a temperature of 210 to 260° C., and the tension rate is preferably 1.81% to 2.30%.

In this way, it is possible to achieve optimal properties of the yarn produced, such as optimized breaking strength and elongation at break, and optimized hot shrinkage and modulus.

Preferably, the heat-setting that takes place here after the drawing is effected by means of a fourth godet roll pair (GR4) at a speed of 5800 to 6200 m/min at a temperature of 210 to 260° C., a downstream fifth godet roll pair (GR5) at a speed of 5600 to 6200 m/min at a temperature of 210 to 260° C. and a downstream sixth godet roll pair (GR6) at a speed of 5450 to 6000 m/min at a temperature of 100 to 150° C., where the relaxation rate is 2.5% to 6.0%.

In this way, it is possible to achieve optimal crystallization, a stable microstructure, optimal breaking strength and an optimal modulus and a reduction in hot shrinkage. The yarn is thus optimally prepared for the downstream winding process and the heat-setting.

The winding in step d) is preferably effected at a winding speed of 5450 to 5950 m/min.

By the process steps a) to d) described, a yarn is obtained that has a breaking strength of 7.5 to 9.0 g/d, and elongation at break of 10.2% to 15.5%, a hot shrinkage of 3.2% to 5.2%, a crystallization level of 45% to 53.5% and an IPA content of 0.12% to 5% by weight, especially 0.12% to 2.2% by weight.

In addition, it is possible to obtain the yarn with a fineness of 300 to 4000 denier.

The resultant HMLS-PET yarn comprising 10% to 100% by weight of recycled PET is especially and preferably processed further by at least the following process steps in order to obtain the rubberized strength member of the invention:

e) twisting;
f) optionally weaving;
g) modification of adhesion with a dip;
h) rubberization with a rubberization mixture.

In advantageous embodiments of the invention, the yarn is first itself twisted and then twisted with a further, likewise twisted yarn to form a cord.

The yarns used in the cord may each be formed from filaments twisted in S or Z direction. It is thus possible, for example, for the HMLS-PET yarn comprising recycled PET to be S- or Z-twisted.

The twisted yarns are then finally twisted in S or Z direction to form a reinforcement cord. Advantageously, the yarns of a reinforcement cord all have the same direction of rotation, i.e. they have been twisted either in S or Z direction. In this advantageous variant, the reinforcement cord has the opposite direction of rotation from the yarns. For example, an S-twisted HMLS-PET yarn comprising recycled PET may be finally twisted with a further S-twisted HMLS-PET yarn—comprising recycled PET—in Z direction to form a reinforcement cord.

Alternatively, it is also conceivable that a corresponding hybrid cord is obtained, wherein, for example, an S-twisted HMLS-PET yarn comprising recycled PET is finally twisted with a further yarn. Illustrative and preferred materials for the further yarn have been set out above.

In advantageous embodiments of the invention, two yarns are twisted in a direct cabling machine to form a cord from two yarns (x2 cord).

The number of twists of the yarns and cords (tpm, "turns per meter") is preferably 100 to 500 tpm in each case.

Cords comprising the first yarn preferably have a twist factor TF of 150 to 250. The twist factor is calculated as follows by formula I):

$$TF = N*(K/9000)^{0.5} \quad \text{I)}$$

where N is the number of twists (in tpm) and K is the cord fineness and ^0.5 is supposed to represent the square root (of the expression in brackets), i.e. TF=number of twists (in tpm)*(times) [cord fineness (in denier)/9000]^0.5 (to the power of 0.5)

The following should preferably be noted in the weaving (step f):

In the arrangement of the yarn on the package creel, the strain on each package of yarn is controlled by roller bearings and rubber belts in order to assure homogeneous strain. During the weaving process, the yarn is guided through the reed adapted in accordance with the specifications, and woven on an airjet weaving machine. Then the cord is woven to give loom-state fabric of preset width, the weft yarn being in particular a yarn having an elastic core of PET or nylon, for example, wrapped with cotton, for example.

The loom-state fabric obtained in step f) is then processed further by means of a dip in step g). As a result of this, the strength member, especially the yarn or cord, is given ideal physical properties and optimized adhesion capacity to the rubberization mixture applied later.

More particularly, the dip may comprise a pre-dip and an RFL (resorcinol-formaldehyde latex) dip known in the art or an RFL-free alternative which is benign in respect of the environment and health, as described, for example, in DE 102014211362 A1 or WO 2019015792 A1.

The modification of adhesion by means of a dip in step g) may thus especially comprise 1-bath or 2-bath (pre-dip and dip) methods known in the art.

During the dipping method, devices and conditions known in the art are used successively, such as dip solution tanks, tension zones and ovens. This stretches the fabric or cord (according to whether the weaving is effected according to step f)) by 0% to 8%, especially 0% to 3%.

The subsequent rubberization in step h) is effected in a manner known to the person skilled in the art by means of a rubberization mixture and apparatuses known to the person skilled in the art. This may involve drying prior to the rubberization at high temperatures, especially of more than 100° C.

The rubberization mixture may be any suitable rubberization mixture known to the person skilled in the art for ensheathing of strength members, especially textile strength members.

The rubberization mixture preferably comprises at least one diene rubber.

Diene rubbers are rubbers which are formed by polymerization or copolymerization of dienes and/or cycloalkenes and thus have C=C double bonds either in the main chain or in the side groups.

In advantageous embodiments, the diene rubber is selected from the group consisting of natural polyisoprene (NR), synthetic polyisoprene (IR), butadiene rubber (BR), solution-polymerized styrene-butadiene rubber (SSBR) and emulsion-polymerized styrene-butadiene rubber (ESBR).

In advantageous embodiments, the rubberization mixture contains at least one carbon black as nonpolar filler.

The carbon black is preferably used in the rubberization mixture in amounts of 0.1 to 100 phr, more preferably in amounts of 40 to 100 phr, most preferably in amounts of 40 to 80 phr. It is particularly preferred in turn when the rubber mixture contains 57 to 67 phr of at least one carbon black. In this way, particularly good mixture properties are achieved with regard to tear properties.

The present invention further provides the described process comprising at least steps a) to h). The strength member of the invention has preferably been produced by this method. The present invention thus further provides strength members obtained by means of the process described.

The invention is to be elucidated in detail hereinafter by some working examples. In this regard, first of all, table 1 gives an overview of yarns and their production parameters that are used by way of example in the strength member of the invention.

The above remarks are applicable here in addition to the specifically specified parameters. More particularly, in all examples E1 to E6, the process according to steps a) to d) was performed, including the solid-state polymerization as described above. The raw PET chips were pre-crystallized at a temperature of 150 to 180° C. for 0.5 to 1.5 hours and then crystallized at a temperature of 200 to 230° C. for 4 to 6 hours and finally left to react in an SSP reactor at a wall temperature of 200 to 220° C. for 30 to 35 hours.

The entire system of apparatuses was operated in a nitrogen atmosphere, where the oxygen content of the nitrogen was kept at 30 to 70 ppm and the dew point was preferably lower than −70° C. (lower than minus 70° C.).

TABLE 1

|  | E 1 | E 2 | E 3 | E 4 | E 5 | E 6 |
|---|---|---|---|---|---|---|
| Source of the PET chips | Recycled PET | Mixture of recycled PET and virgin PET | | | | |
| Proportion of recycled PET in the raw chip (% by wt.) | 100 | 10 | 40 | 60 | 90 | 80 |

TABLE 1-continued

|  |  | E1 | E 2 | E 3 | E 4 | E 5 | E 6 |
|---|---|---|---|---|---|---|---|
| IPA content (% by wt.) | | 1.5 | 0.15 | 0.60 | 0.90 | 1.35 | 1.20 |
| Intrinsic viscosity | | 0.55 | 0.70 | 0.68 | 0.72 | 0.75 | 0.75 |
| Process parameters | | | | | | | |
| Intrinsic viscosity of the high-viscosity chips | | 0.85 | 1.05 | 1.00 | 1.05 | 1.15 | 1.12 |
| Drying | Temperature (° C.) | 140 | 130 | 120 | 160 | 150 | 150 |
| | Time (hour) | 8.5 | 8.0 | 9.0 | 9.5 | 8.5 | 8.5 |
| Mixing | Mixing ratio (%) | 100 | 10 | 40 | 60 | 90 | 80 |
| Extrusion | Feed zone T (° C.) | 315 | 330 | 310 | 320 | 300 | 300 |
| | Compression zone T (° C.) | 305 | 320 | 300 | 310 | 290 | 290 |
| | Metering zone T (° C.) | 295 | 310 | 290 | 300 | 280 | 280 |
| | Melt temperature (° C.) | 285 | 300 | 280 | 290 | 270 | 270 |
| | Extruder head pressure (MPa) | 16 | 18 | 15 | 17 | 14 | 14 |
| Spinning | DEN (D) | 1500 | 1000 | 1300 | 1500 | 1500 | 1500 |
| | Number of holes | 370 | 180 | 280 | 320 | 480 | 480 |
| | L/D | 2.1 | 3.0 | 1.7 | 2.5 | 1.2 | 1.2 |
| | Reheating temperature (° C.) | 315 | 350 | 305 | 330 | 280 | 320 |
| | Buffer zone length (mm) | 60 | 100 | 45 | 75 | 20 | 100 |
| | Blowing pressure (MPa) | 35 | 50 | 38 | 26 | 15 | 30 |
| | Blowing temperature (° C.) | 45 | 65 | 38 | 52 | 22 | 65 |
| Oiling | Absorption rate (% by wt.) | 0.6 | 0.9 | 0.5 | 0.7 | 0.3 | 0.5 |
| Drawing | GR1 speed (m/min) | 2950 | 2700 | 2900 | 2750 | 3200 | 3180 |
| | GR1 temp. (° C.) | 70 | 80 | 66 | 74 | 60 | 80 |
| | GR2 speed (m/min) | 4400 | 5000 | 4200 | 4600 | 3800 | 3850 |
| | GR2 temp.(° C.) | 80 | 90 | 76 | 84 | 70 | 90 |
| | GR3 speed (m/min) | 6000 | 6200 | 5950 | 6050 | 5800 | 5800 |
| | GR3 temp. (° C.) | 235 | 260 | 220 | 240 | 210 | 250 |
| | Tension rate | 2.03 | 2.30 | 1.97 | 2.20 | 1.81 | 1.82 |
| Heat-setting | GR4 speed (m/min) | 6000 | 6200 | 5850 | 6050 | 5800 | 5800 |
| | GR4 temp. (° C.) | 235 | 260 | 220 | 240 | 210 | 250 |
| | GR5 speed (m/min) | 6000 | 6200 | 5850 | 6050 | 5800 | 5600 |
| | GR5 temp. (° C.) | 235 | 260 | 220 | 240 | 210 | 250 |
| | GR6 speed (m/min) | 5800 | 6000 | 5850 | 5850 | 5600 | 5450 |
| | GR6 temp. (° C.) | 125 | 150 | 115 | 135 | 100 | 120 |
| | Relaxation rate (%) | 3.3 | 4.0 | 2.5 | 3.3 | 3.5 | 6.0 |
| Winding | Winding speed (m/min) | 5800 | 5950 | 5800 | 5850 | 5600 | 5450 |

In FIG. 1, examples E1 to E6 are plotted in a bar diagram against the proportion of recycled PET, with the height of the bars representing $CO_2$ emission (kg of $CO_2$/kg of product). The figures are based on PET chip production excluding the contributions to the production of the monomers such as monoethylene glycol (MEG) and PTA (purified terephthalic acid). The subsequent processes starting with yarn production are viewed as being independent of the PET raw material with regard to $CO_2$ emissions.

The bar on the left-hand side represents the $CO_2$ emission of virgin PET, while the two bars on the right-hand side represent the $CO_2$ emission of bio-based PET (the ethylene glycol monomer was obtained from corn, such that about 30% by weight of the raw materials comes from renewable raw materials) and HIPS (high-impact polystyrene).

As apparent from FIG. 1, the lowest $CO_2$ emission is achieved with a PET that has been produced from 100% by weight of recycled PET. The $CO_2$ balance of the recyclate commences only after use as a PET bottle, for example.

The "Virgin PET" and "Bio PET" bars do not include $CO_2$ emission on account of the monomers made from different raw materials. This means that these values comprise essentially the polycondensation to PET chips.

In the case of 100% recycled PET, the value comprises essentially the comminution and the remelting to give PET chips.

The values in between—i.e. with 10% to 90% PET—are calculated proportionately from the values for "Virgin PET" and 100% recycled PET.

In addition, further experiments were conducted, in each of which 100% by weight of recycled PET (like E1) was used, but different process steps were adjusted in each case.

The procedure in comparative experiment V2 was as in E1, except that the entire process of solid-state polymerization was omitted.

The procedure in comparative experiment V3 was as in E1, except that the solid-state polymerization was performed without the steps of pre-crystallization and crystallization.

The procedure in comparative experiment V4 was as in E1, except that the undrawn yarn after the spinning process was cooled directly by means of cooling air without reheating with a buffer zone (cf. step c)).

The procedure in comparative experiment V5 was as in E3, except that the undrawn yarn after the spinning process was cooled directly by means of cooling air without reheating with a buffer zone (cf. step c)).

Table 2 shows the influence of the different versions of the process on the physical properties of their respective yarn. The properties were determined by means of the methods described above.

A further criterion used was at the level of filament breaks in the yarn production process. For each bobbin (9 kg, length 62 km, 1300 den), it was stipulated that the number of filament breaks must be less than 10 for it to be classified as qualified (Q). Otherwise, the sample was rated as inadequate (NQ).

of filament and yarn breaks and generally makes it significantly more difficult to produce the yarns.

If the pre-crystallization and crystallization are performed as part of the solid-state polymerization process, it is pos-

TABLE 2

|  | E1 | E2 | E3 | E4 | E5 | E6 | V2 | V3 | V4 | V5 |
|---|---|---|---|---|---|---|---|---|---|---|
| Denier (den) | 1500 | 1000 | 1300 | 1500 | 1500 | 1500 | 1500 | 1500 | 1500 | 1500 |
| Proportion of rPET | 100% | 10% | 40% | 60% | 90% | 80% | 100% | 100% | 100% | 100% |
| IPA content | 1.50 | 0.15 | 0.60 | 0.90 | 1.35 | 1.20 | 1.50 | 1.50 | 1.50 | 1.50 |
| Crystallinity (%) | 48.2 | 53.5 | 51.5 | 50.3 | 49.5 | 45.0 | 45.2 | 48.5 | 48.4 | 47.7 |
| Number of filaments | 370 | 180 | 280 | 320 | 480 | 480 | 370 | 370 | 370 | 370 |
| Filament fineness (den) | 4.1 | 5.6 | 4.6 | 4.7 | 3.1 | 3.1 | 4.1 | 4.1 | 4.1 | 4.1 |
| Breaking strength (g/den) | 7.8 | 9.0 | 8.2 | 8.0 | 7.9 | 7.5 | 5.2 | 7.6 | 7.5 | 7.2 |
| Elongation at break (%) | 11.9 | 12.1 | 10.2 | 10.8 | 11.5 | 15.5 | 10.2 | 11.5 | 11.0 | 11.2 |
| Elongation at 45N | 3.5 | 5.6 | 4.7 | 3.5 | 3.6 | 3.6 | 5.3 | 3.7 | 4.0 | 4.2 |
| Elongation at 45N (%/den) | 0.0023 | 0.0056 | 0.0036 | 0.0023 | 0.0024 | 0.0024 | 0.0033 | 0.0025 | 0.0027 | 0.0028 |
| Hot shrinkage at 177° C. (%) | 4.7 | 4.2 | 5.2 | 4.8 | 4.5 | 3.2 | 2.1 | 4.5 | 5.0 | 4.8 |
| Reject rate (%) | 3.3 | 3.5 | 3.2 | 3.2 | 3.6 | 2.8 | 30.5 | 9.7 | 18.2 | 22.4 |
| Level of filament breaks | Q | Q | Q | Q | Q | Q | NQ | NQ | NQ | NQ |

The data in table 2 show that yarns produced by the process comprising steps a) to d) comprising solid-state polymerization, spinning, the cooling process and the drawing process have properties such as breaking strength and elongation at break that are comparable to traditionally produced yarns. It is thus possible with the yarns according to examples E1 to E6 to produce rubberized strength members of the invention and vehicle tires including the rubberized strength members, especially in a strength member ply, efficiently and with a low failure rate (<4%), simultaneously ensuring that the corresponding demands in use are met on account of the high-quality properties.

Compared to V2, the solid-state polymerization in E1 achieves molecular chain growth and a reduction in additions present in recycled PET, for example of alternative monomers to p-terephthalic acid, for example IPA.

Compared to V3, the pre-crystallization and crystallization as part of the solid-state polymerization process in E1 achieve improved quality and processability of the high-viscosity chips, and reduce adverse effects such as cementation and agglomeration in the SSP reactor. If these adverse effects occur, this leads to irregular discharge of the SSP reactor and elevated variance in the intrinsic viscosity of the high-viscosity chips. Moreover, this leads to further adverse consequences, such as a heterogeneous melting point, heterogeneous melting characteristics and a heterogeneous crystallization rate of the yarn. This increases the frequency sible to effectively control the homogeneity of viscosity, melting point and crystallization rate of the high-viscosity chips.

If the SSP process is not performed, the breaking strength of the yarns produced does not meet demands, there is an increased frequency in filament and yarn breaks, and production efficiency is reduced.

Example V4 shows that, in the case of omission of reheating and the buffer zone after the spinning, the undrawn yarn cools down too quickly and hardens and crystallizes prematurely, which leads to a lower production efficiency and poorer physical properties.

Example V5 shows that, in the case of omission of pre-crystallization and crystallization in the SSP process and of omission of reheating and the buffer zone after the spinning, poor homogeneity of the high-viscosity chips and a rapid rate of crystallization in the spinning and poor spinnability and a lower crystallization level of the finished yarn are achieved.

The pre-crystallization and crystallization should therefore be combined with the reheating and the buffer zone as described above in order to slow the crystallization rate and increase the crystallization level.

The yarns of examples E1 to E6 and V2 to V5 adduced above were each used to produce cords by twisting two yarns, and these cords were woven and dipped, giving a dipped fabric.

The twisting was effected by twisting two yarns in a direct cabling machine to form a cord from two yarns (x1x2 cord).

The yarns have been twisted in S direction, while the cord has been twisted in Z direction.

The following conditions were observed in the weaving:

In the arrangement of the yarn on the package creel, the strain on each package of yarn was controlled by roller bearings and rubber belts in order to assure homogeneous strain. During the weaving process, the yarn was guided through the reed adapted in accordance with the specifications, and woven on an airjet weaving machine. Then the cord was woven to form loom-state fabric of preset width, and the weft thread was a 22.2 tex nylon core-spun yarn (core composed of nylon monofilament, ensheathed with cotton staple fibers).

The resultant loom-state fabric was then processed further by means of a dip. A 2-bath dip method was employed here. An epoxy compound (trade name: Grilbond® G 1701, from EMS-GRILTECH) and an isocyanate compound (trade name: Grilbond® IL-6 50% F, from EMS-GRILTECH) were provided in a first bath, and the yarns were dipped therein and hence their superficial filaments were activated.

In a second bath, a resorcinol-formaldehyde latex (precondensed resin of resorcinol and formaldehyde in an aqueous dispersion mixed with formaldehyde and latex inter alia) was provided, and the fabric activated by means of the first bath was dipped therein. During the dipping method, devices and conditions known in the art were used successively, such as dip solution tanks, tension zones and ovens.

In addition, hot stretching took place, establishing a net stretch of 0% to 1%.

The cords obtained were examined for their properties, with the results collated in table 3.

The entry 1500/2 should be read as 1500 den/2 and means that 2 yarns each with a fineness of 1500 den were twisted to form a cord. The same applies to entry 1000/2.

The number of turns per meter (tpm) in table 3 relates to the respective cord.

Residual strength was ascertained by means of a Goodrich fatigue test under the following conditions: 1800 rpm (revolutions per minute), duration: 24 hours, 20% compression, 6.5% strain, at room temperature.

invention, especially for vehicle tires. Comparative examples V2 to V5, by contrast, show poorer properties and are therefore not as suitable. The major damage to the filaments in the high-speed spinning in particular means that the fatigue resistance of the cord produced is significantly adversely affected. As apparent from example V2, the sample broke before the end of the fatigue test.

It has thus been possible, as shown by examples E1 to E6, to provide a rubberized strength member of the invention for elastomeric products, especially vehicle tires, which has been produced in a particularly resource-conserving and environmentally benign manner and simultaneously has good physical properties, such that it meets the demands, especially in driving operation of vehicle tires. At the same time, the vehicle tire of the invention includes the rubberized strength member at least in the carcass ply, and especially a multitude of the rubberized strength members in a corresponding strength member ply that forms the carcass ply.

An illustrative composition of a rubberization mixture of the rubberized strength member of the invention is shown in table 4.

TABLE 4

| Constituents | Units | Amount |
|---|---|---|
| Polyisoprene | phr | 50 |
| Polybutadiene | phr | 20 |
| ESBR [a] | phr | 41.25 |
| N660 carbon black | phr | 65 |
| Plasticizer oil/tackifying resin | phr | 20.5 |
| Aging inhibitor | phr | 2 |
| Resorcinol resin | phr | 1.63 |
| Hexamethoxymethylmelamine [b] | phr | 2 |
| Stearic acid | phr | 1 |
| Zinc oxide | phr | 3 |
| Accelerator | phr | 1 |
| Sulfur with 33% oil | phr | 3.8 |

[a] oil-extended with 27.3% aromatics-free oil
[b] 65% on inorganic support

The invention claimed is:
1. A rubberized strength member for elastomeric products comprising:

TABLE 3

| | E1 | E2 | E3 | E4 | E5 | E6 | V2 | V3 | V4 | V5 |
|---|---|---|---|---|---|---|---|---|---|---|
| Cord construction | 1500/2 | 1000/2 | 1300/2 | 1500/2 | 1500/2 | 1500/2 | 1000/2 | 1500/2 | 1500/2 | 1500/2 |
| Proportion of rPET | 100% | 10% | 40% | 60% | 90% | 80% | 100% | 100% | 100% | 100% |
| tpm | 320 | 430 | 370 | 320 | 320 | 320 | 430 | 320 | 320 | 320 |
| Breaking force (N) | 214.4 | 160.7 | 193.5 | 223.2 | 215.9 | 205.5 | 82.5 | 209.4 | 202.0 | 192.8 |
| Elongation at break (%) | 16.2 | 14.7 | 16.6 | 16.2 | 15.6 | 16.0 | 9.7 | 15.1 | 13.5 | 13.0 |
| Elongation at 45N (%) | 2.3 | 4.1 | 3.2 | 2.4 | 2.4 | 2.4 | 5.6 | 2.4 | 2.7 | 2.9 |
| Elongation at 45N (%/den) | 0.0008 | 0.0021 | 0.0012 | 0.0008 | 0.0008 | 0.0008 | 0.0028 | 0.0008 | 0.0009 | 0.0010 |
| Hot shrinkage (%) (180° C., 2 min, 0.05 g/den) | 2.3 | 1.8 | 1.7 | 2.2 | 2.1 | 2.4 | 1.3 | 2.4 | 2.2 | 2.4 |
| Residual strength (%) | 83.9 | 85.5 | 86.0 | 83.3 | 84.8 | 82.5 | 0 | 77.2 | 65.5 | 55.6 |

As apparent from table 3, it was possible by examples E1 to E6 to produce cords having properties that meet the demands for use in a rubberized strength member of the at least one first yarn comprised of a High Modulus Low Shrinkage polyethylene terephthalate (HMLS-PET) comprising recycled PET;

wherein the first yarn is twisted in a x2 cord, where the cord has a twist factor of 150 to 250 and a breaking force of at least 6.3 g/den and has an elongation at 45 N of less than 0.0056%/den and hot shrinkage of less than 3%;

wherein the first yarn of HMLS-PET has a crystallization level of 45% to 53.5%.

2. The rubberized strength member of claim 1, the first yarn of HMLS-PET comprises 10% to 100% by weight of recycled PET.

3. The rubberized strength member of claim 1, the first yarn of HMLS-PET includes 0.12% to 5% by weight, of isophthalic acid (IPA).

4. The rubberized strength member of claim 1, the first yarn of HMLS-PET has a fineness of 300 to 4000 denier (den).

5. The rubberized strength member of claim 1, produced by a process comprising the steps:
   a) performing pre-crystallization, crystallization and solid-state polymerization of the PET from a) to give high-viscosity PET chips having an intrinsic viscosity of 0.85 to 1.15 dl/g;
   b) drying, and mixing the chips of recycled PET with chips of virgin PET to obtain PET chips comprising up to 10% to 100% by weight of chips from recycled PET, melting and extruding of the PET chips for the yarn spinning, subsequent yarn spinning by means of a spinneret comprising a reheater having a buffer zone with the high-viscosity PET chips from step b), and stepwise cooling of the unstretched yarn, wherein the water content of the chips after drying is less than 30 ppm, the temperature of the reheater beneath the spinneret is 280 to 350° C. and the length of the buffer zone beneath the reheater during the stepwise cooling is 20 to 100 mm;
   c) oiling, drawing, heat-setting and winding after the stepwise cooling in step c) to obtain an HMLS-PET yarn.

6. The rubberized strength member of claim 1, the first yarn of HMLS-PET comprises 30% to 100% by weight of recycled PET.

7. The rubberized strength member of claim 1, the first yarn of HMLS-PET comprises 50% to 100% by weight of recycled PET.

8. The rubberized strength member of claim 1, the first yarn of HMLS-PET includes 0.12% to 2.2% by weight of isophthalic acid (IPA).

9. The rubberized strength member of claim 1, the first yarn of HMLS-PET has a fineness of 300 to 3100 den.

10. The rubberized strength member of claim 1, the first yarn of HMLS-PET has a fineness of 300 to 2000 den.

11. The rubberized strength member of claim 1, the first yarn of HMLS-PET has a fineness of 900 to 2000 den.

12. The rubberized strength member of claim 1,
   the first yarn of HMLS-PET comprises 50% to 100% by weight of recycled PET,
   the first yarn of HMLS-PET includes 0.12% to 2.2% by weight of isophthalic acid (IPA),
   the first yarn of HMLS-PET has a fineness of 900 to 2000 den.

13. A process for producing a rubberized strength member comprising:
   a) providing PET chips comprising 100% by weight of recycled PET from PET bottles or other PET products and optionally provision of chips of virgin PET;
   b) performing pre-crystallization, crystallization and solid-state polymerization of the PET from a) to give high-viscosity PET chips having an intrinsic viscosity of 0.85 to 1.15 dl/g;
   c) drying, and mixing the chips of recycled PET with chips of virgin PET to obtain PET chips comprising up to 10% to 100% by weight of chips from recycled PET, melting and extruding of the PET chips for the yarn spinning, subsequent yarn spinning by means of a spinneret comprising a reheater having a buffer zone with the high-viscosity PET chips from step b), and stepwise cooling of the unstretched yarn, wherein the water content of the chips after drying is less than 30 ppm, the temperature of the reheater beneath the spinneret is 280 to 350° C. and the length of the buffer zone beneath the reheater during the stepwise cooling is 20 to 100 mm;
   d) oiling, drawing, heat-setting and winding after the stepwise cooling in step c) to obtain an HMLS-PET yarn;
   e) twisting;
   f) weaving;
   g) performing modification of adhesion with a dip;
   h) performing rubberization with a rubberization mixture;
   wherein the first yarn is twisted in a x2 cord, where the cord has a twist factor of 150 to 250 and a breaking force of at least 6.3 g/den and has an elongation at 45 N of less than 0.0056%/den and hot shrinkage of less than 3%;
   wherein the first yarn of HMLS-PET has a crystallization level of 45% to 53.5%.

14. A vehicle tire comprising:
   a sidewall having a plurality of strength members;
   the plurality of strength members comprised of a High Modulus Low Shrinkage polyethylene terephthalate (HMLS-PET) comprising recycled PET, 50% to 100% by weight, of recycled PET, 0.12% to 2.2% by weight, of isophthalic acid (IPA), a crystallization level of 45% to 53.5%, a fineness of 300 to 4000 denier (den), hot shrinkage of less than 8% and elongation at 45 N of less than 0.0056%/den, and a x2 cord, where the cord has a twist factor of 150 to 250 and a breaking force of at least 6.3 g/den and has an elongation at 45 N of less than 0.0056%/den and hot shrinkage of less than 3%.

15. The vehicle tire of claim 14, the plurality of strength members formed as a strength member ply.

16. The vehicle tire of claim 14 further comprising a carcass ply, a belt bandage, a belt ply and a bead reinforcement that comprise the plurality of strength members.

17. The vehicle tire of claim 14, further comprising a carcass ply, where the carcass ply is run around a bead twice (two-ply construction) in a turnup, wherein the end of the ply/plies lies between the core and the edge of the belt and the carcass ply comprises a plurality of strength members comprised of the High Modulus Low Shrinkage polyethylene terephthalate (HMLS-PET).

18. The tire of claim 14, wherein the strength member is produced by a process comprising the steps:
   a) performing pre-crystallization, crystallization and solid-state polymerization of the PET from a) to give high-viscosity PET chips having an intrinsic viscosity of 0.85 to 1.15 dl/g;
   b) drying, and mixing the chips of recycled PET with chips of virgin PET to obtain PET chips comprising up to 10% to 100% by weight of chips from recycled PET, melting and extruding of the PET chips for the yarn spinning, subsequent yarn spinning by means of a spinneret comprising a reheater having a buffer zone with the high-viscosity PET chips from step b), and stepwise cooling of the unstretched yarn, wherein the water content of the chips after drying is less than 30 ppm, the temperature of the reheater beneath the spinneret is 280 to 350° C. and the length of the buffer zone beneath the reheater during the stepwise cooling is 20 to 100 mm;

c) oiling, drawing, heat-setting and winding after the stepwise cooling in step c) to obtain an HMLS-PET yarn.

\* \* \* \* \*